Figure 1:
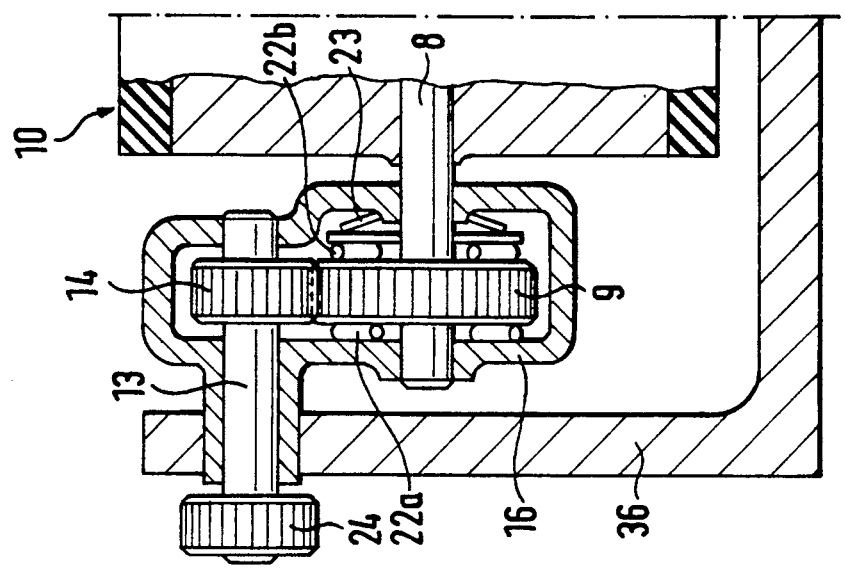

United States Patent [19]

Sundseth

[11] Patent Number: 5,048,672

[45] Date of Patent: Sep. 17, 1991

[54] ROLLER DRIVE UNIT

[75] Inventor: Jarl Sundseth, Neuhaus, Fed. Rep. of Germany

[73] Assignee: Electro Pneumatic International GmbH, Fed. Rep. of Germany

[21] Appl. No.: 504,339

[22] Filed: Apr. 3, 1990

[30] Foreign Application Priority Data

Apr. 6, 1989 [DE] Fed. Rep. of Germany ....... 3911214

[51] Int. Cl.$^5$ ............................................ B65G 13/02
[52] U.S. Cl. ..................................... 198/782; 198/788
[58] Field of Search ............... 198/780, 782, 788, 789, 198/791; 193/35 SS; 244/137.1

[56] References Cited

U.S. PATENT DOCUMENTS

| 1,868,825 | 7/1932 | Grosjean | 198/788 |
| 2,608,286 | 8/1952 | Henschker | 198/782 |
| 2,753,724 | 7/1956 | Leyer et al. | 474/109 |
| 3,631,964 | 1/1972 | Hinman et al. | 198/789 |
| 3,690,440 | 9/1972 | Macpherson | 198/782 |
| 3,698,539 | 10/1972 | Schwarzbeck | 198/782 |
| 3,712,454 | 1/1973 | McKee | 198/782 |
| 3,737,022 | 6/1973 | DeNeefe et al. | 198/782 |
| 4,697,694 | 10/1987 | Huber | 198/782 |
| 4,792,037 | 12/1988 | Huber | 198/788 |

FOREIGN PATENT DOCUMENTS

| 903127 | 6/1972 | Canada . |
| 0149658 | 7/1985 | European Pat. Off. . |
| 906434 | 7/1949 | Fed. Rep. of Germany . |
| 1956946 | 11/1970 | Fed. Rep. of Germany . |
| 3724126 | 2/1989 | Fed. Rep. of Germany . |
| 2414663 | 8/1979 | France . |
| 1256377 | 12/1971 | United Kingdom . |

Primary Examiner—Robert P. Olszewski
Assistant Examiner—James R. Bidwell
Attorney, Agent, or Firm—Eckert Seamans Cherin & Mellott

[57] ABSTRACT

A roller drive unit includes a frame, a drive shaft rotatably mounted in the frame, and a gear mounted on the drive shaft for engaging a drive motor. A pivot support is mounted on the drive shaft and is pivotable from lower rest position to an upper working position. A drive roll is rotatably mounted on the pivot support, and an internal gear is attached to the drive roll. A drive gear is mounted on the drive shaft, and an intermediate gear is rotatably mounted in the pivot support and is engaged between the drive gear and the internal gear. A spring is connected for biasing the pivot support to the lower rest position.

9 Claims, 5 Drawing Sheets

ROLLER DRIVE UNIT

DESCRIPTION

The invention pertains to a roller drive unit according to the introductory part of Patent claim 1.

Such roller drive units are used, for example, for conveying freight containers which are placed on roller conveyors. Such freight containers can be freight containers or freight pallets, a preferred application field of the roller drive unit shown here being freight-loading systems in air freight traffic in which the containers are driven into the cargo space of an aircraft and are stowed there. The roller drive unit is accordingly installed in the aircraft itself.

When such roller drive units are switched on, the rolls belonging to them are pivoted up such that they press on the bottom of a freight container situated above them. As a result of this frictional connection, the torque of the drive rolls can be transmitted to the bottom of the freight container, and the drive rolls thus continue to convey this.

The difficulties in the design of such roller drive units are, on the one hand, that the highest possible pressing force of the drive roll against the bottom of the container must be produced, and on the other hand, the pressing force must be "branched off" from the torque of the motor and not be produced by a separate means. In addition, the drive roll must be pivoted up when the drive motor is switched on regardless of the desired conveying direction of the container and must be lowered again when the motor is switched off. Despite these various requirements which are difficult to satisfy mechanically, the drive unit must be of small design and light weight, since this is an indispensable condition for its primary use in aircraft. Since many such roller drive units are used simultaneously in a conveyor pathway, their reliability must be especially high. The outage of even a single roller drive unit can lead to a disturbance in the loading operation.

From DE-OS 73 24 126, a roller drive unit is known in which the drive motor is installed in the drive roll. The rotor of the drive motor is connected via a planetary gear to a drive gear concentric to the axis of rotation of the rotor. The drive gear is held stationarily (but rotatably) on a frame. The axis of the drive gear and thus of the rotor is arranged eccentrically to the axis of rotation of the hollow-designed drive roll which, in turn, is mounted via bearings on the assymetrically designed stator of the electric motor. The drive gear engages with an internal gear of the drive roll and is braked via a braking arrangement with respect to the frame. When the electric motor is switched on, the drive roll is pivoted up about the axis of the drive gear or the rotor until either its outer jacket come into contact with a freight container to be conveyed or a stop is activated for limiting this pivoting. From this time on, only a rotary motion of the drive roll takes place since the drive gear rolls along the internal gear. This arrangement can be designed only for relatively low driving forces since the installation space for the drive motor, especially with regard to its length which is reduced by the transmission, is limited.

From EP 0 149 658 B1, a roller drive unit of the type initially mentioned is known, the pertinent details of which are explained in detail below with reference to the cross-sectional representation according to FIG. 1. In this known arrangement, a pivot support 16 is pivotable attached about a drive shaft 13 on a frame 36. The drive shaft 13 has a gear 24 on one side which is connected to a torque-transmitting manner via a gear train (not shown) to a drive motor (not shown). On the other end of the drive shaft 13, a drive gear 14 is attached rotationally rigidly and engages with a roller drive gear 9 which sits rotationally rigidly on a roller shaft 8 which is firmly connected to the drive roll 10. The roller drive gear 9 is braked via brakes 22a, 22b mounted on both sides with compression spring rings 23 relative to the pivot support 16. If, in this arrangement, the gear 24 is driven, as a result of the braking device 22a, 22b, 23, torque is applied to the pivot support 16 such that the drive roll 10 is pivoted out of its lower resting position (as shown in FIG. 1) into an upper working position. In this arrangement, it is especially regarded as disadvantageous that the installation width is necessarily considerably greater than the width of the drive roll 10 so that the surface of the latter, which must be as large as possible to achieve a sufficiently large frictional connection, is small compared to the installation width.

The task of the invention is to modify a drive roll unit according to the introductory part of Patent claim 1 by reducing this installation width.

This task is solved by the characteristics indicated in the characterizing part of Patent claim 1.

Therefore, an essential characteristic of the invention is that an intermediate gear is arranged actively between the drive gear and the internal gear ring of the drive roll. In this case, actively means that, if necessary, a pair of intermediate gears connected in parallel can also be provided. As a result of the arrangement of the pivot support in the interior of the drive roll, a reduction of the width of the arrangement is guaranteed.

According to an advantageous version of the arrangement according to the invention, the internal gear, viewed in the longitudinal direction of the drive roll, is installed essentially centrically in the drive roll.

For the first lifting of the drive roll by pivoting when switching on the motor, a braking device is provided which is advantageously mounted on the intermediate gear. To return the drive roll to the rest position when the motor is switched off, gravity and/or a spring act to pretension the pivot support with respect to the frame in the direction of the rest position of the drive roll or to load it with corresponding torque. In another embodiment of the invention, the gear train includes a planetary gear, the sun gear of which is formed by the drive pinion of the electric motor and on the planetary carrier of which the driving occurs in the direction of the drive roll. The ring gear is mounted rotationally movably and can be turned over a limited distance by a spring element. As a result, a rotationally elastic connection is formed between the drive motor and the drive roll which, on the one hand, reduces the torque impulses that are applied when an object to be conveyed strikes the drive roll at a certain speed so that these impulses no longer reach the electric motor directly and the gear train is less affected. On the other hand, when the electric motor is switched off, the stored torque is released and in such a way that the drive roll is loaded or accelerated in the direction of its rest position.

Figure 5:
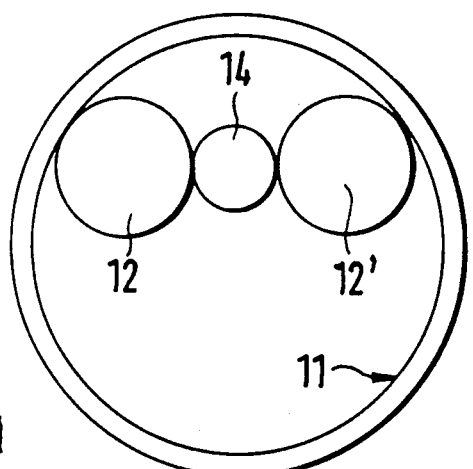
Figure 6:
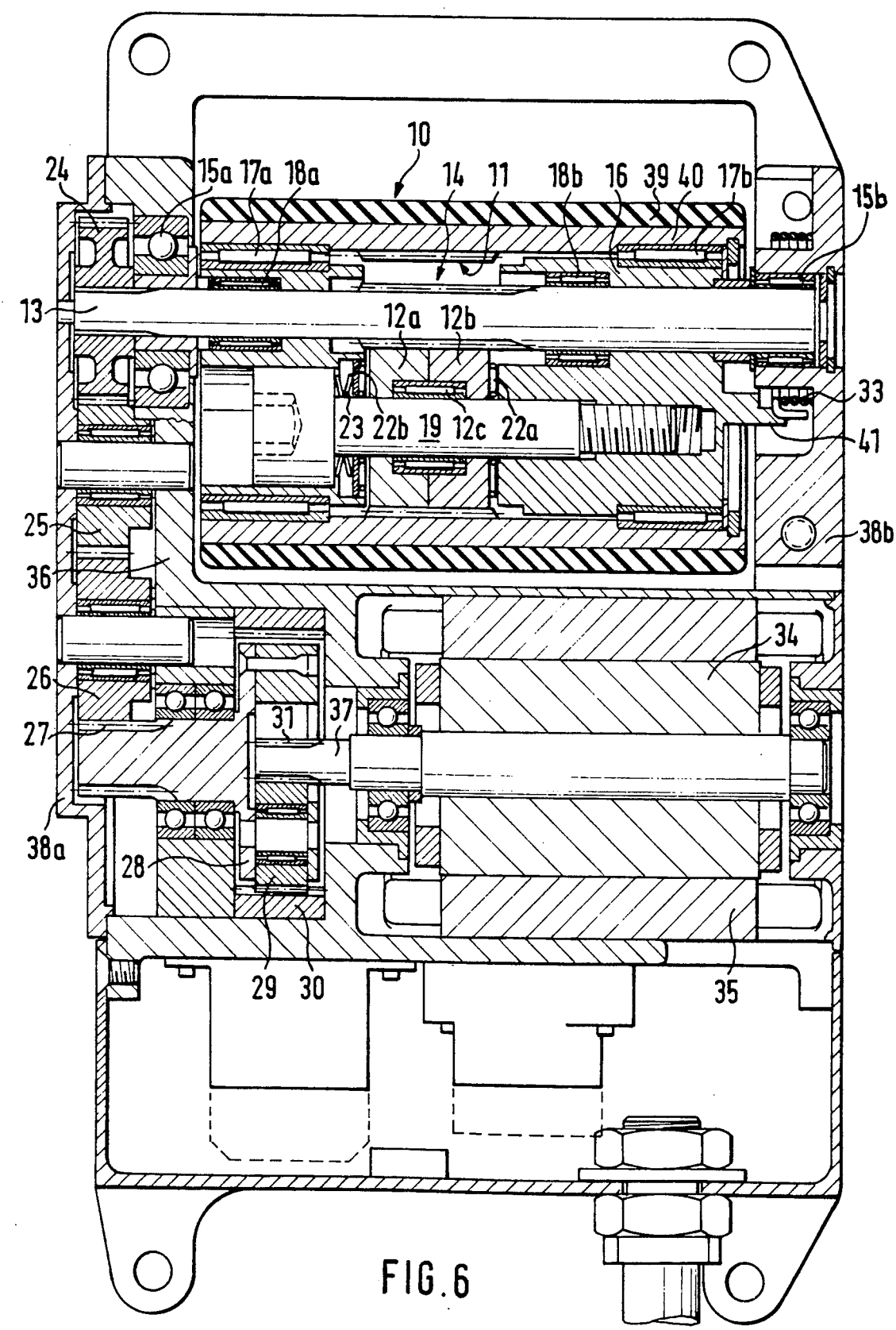
Figure 7:
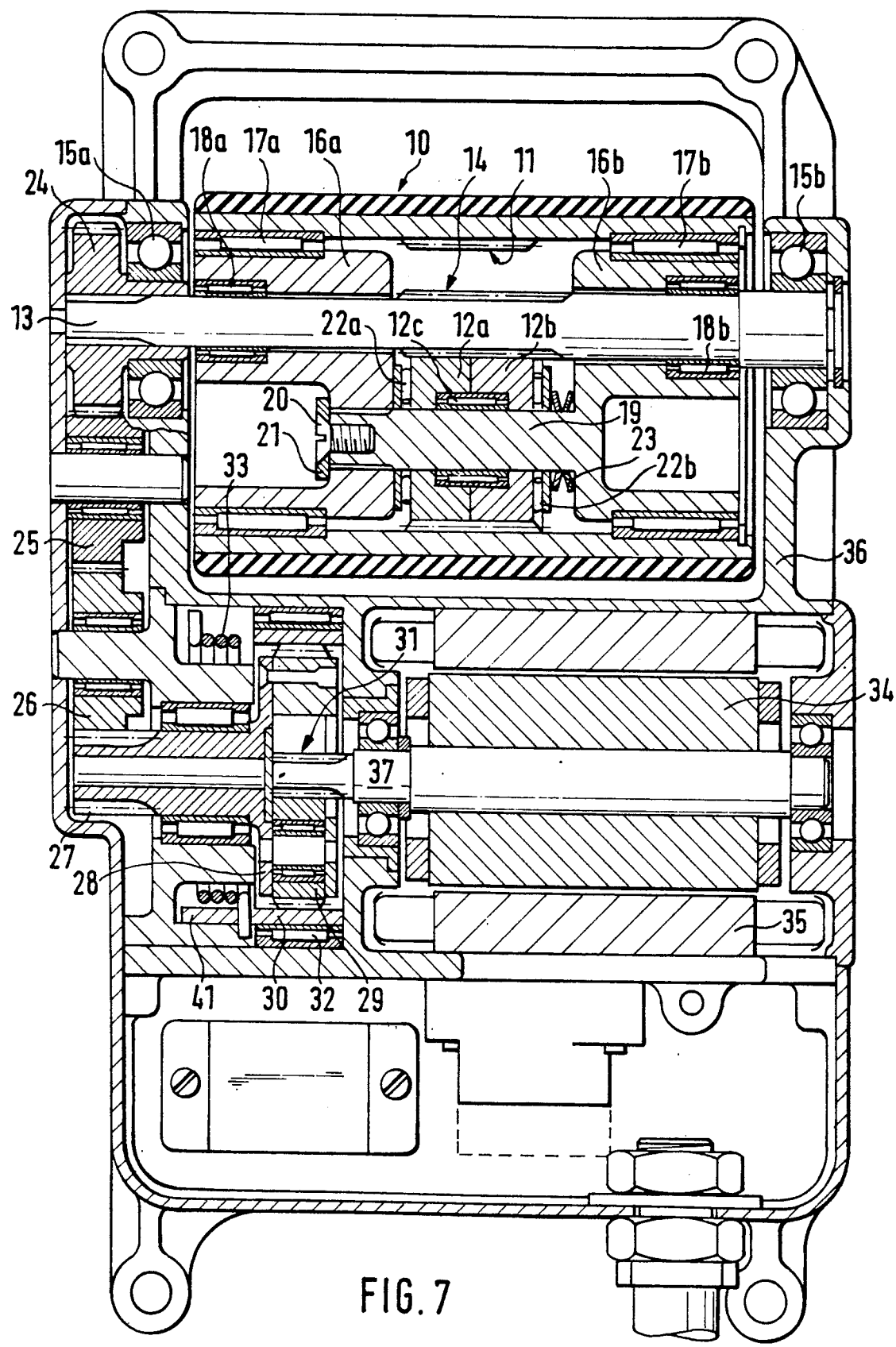
Figure 8:
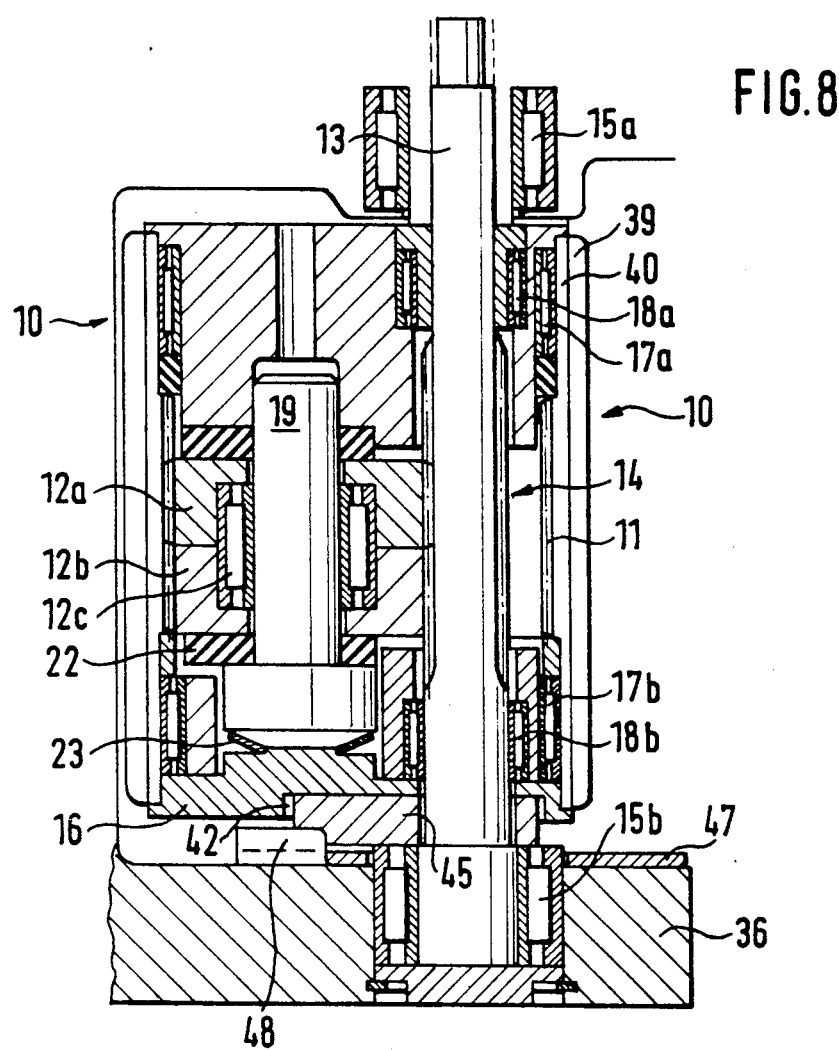
Figure 9:
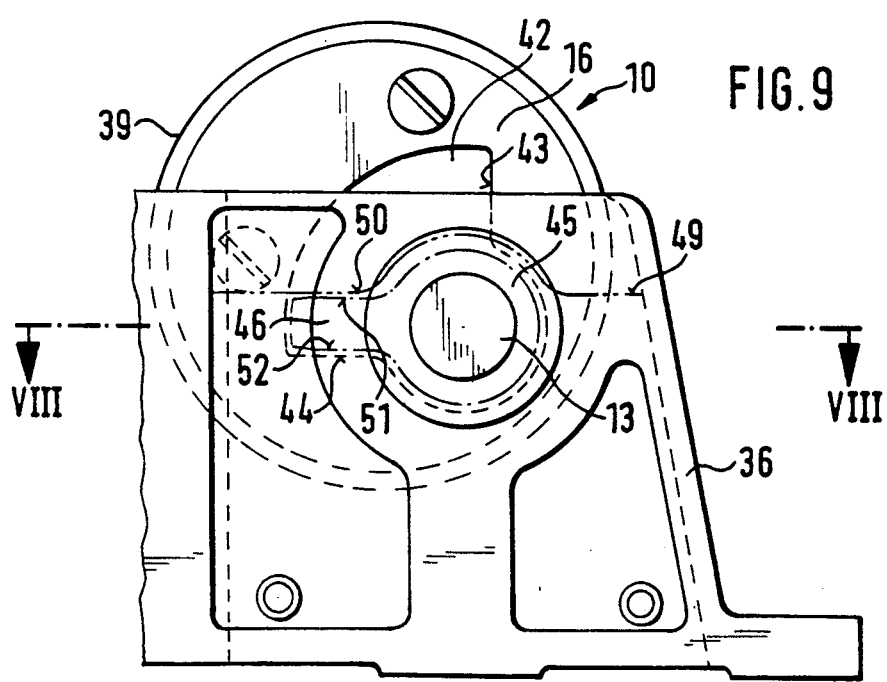

Other characteristics of the invention are derived from the subclaims and the following description of preferred embodiments of the invention which are explained in detail with reference to the drawings. In the drawings, FIG. 1 shows a schematized longitudinal representation of a conventional arrangement, FIG. 2 shows a schematized longitudinal representation of one embodiment of the invention, FIG. 3 shows a section along line III—III of FIG. 2, FIG. 4 shows a transverse section similar to that in FIG. 3 but with the drive roll in its raised driving position, FIG. 5 shows a schematic representation of another embodiment of the invention, FIG. 6 show's the horizontal section through a complete drive unit of the preferred embodiment, FIG. 7 shows horizontal section through another embodiment of the invention, FIG. 8 shows a partial horizontal section through another embodiment of the invention, and FIG. 9 shows a schematized side view of the arrangement according to FIG. 8.

Figure 2:
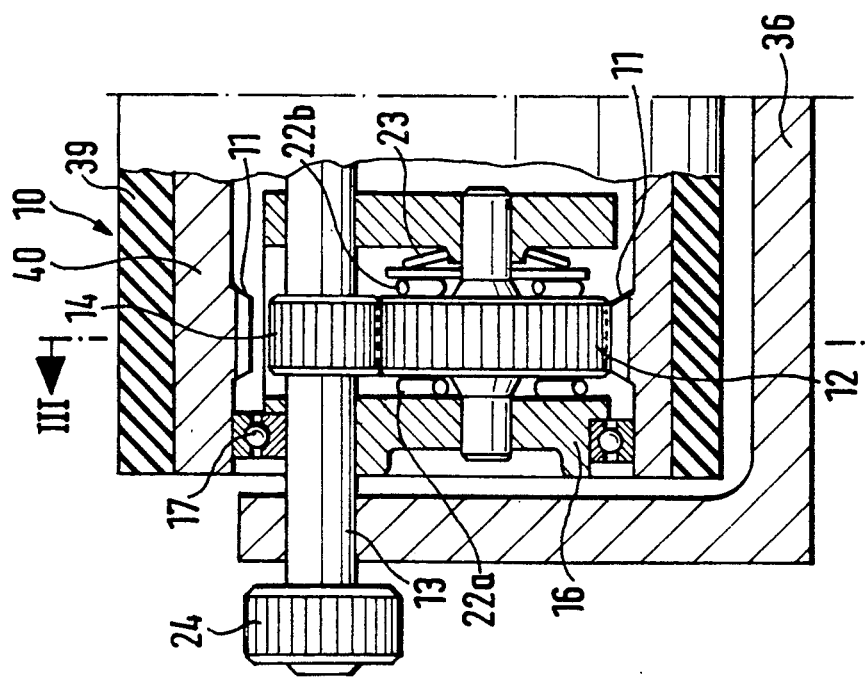
Figure 3:
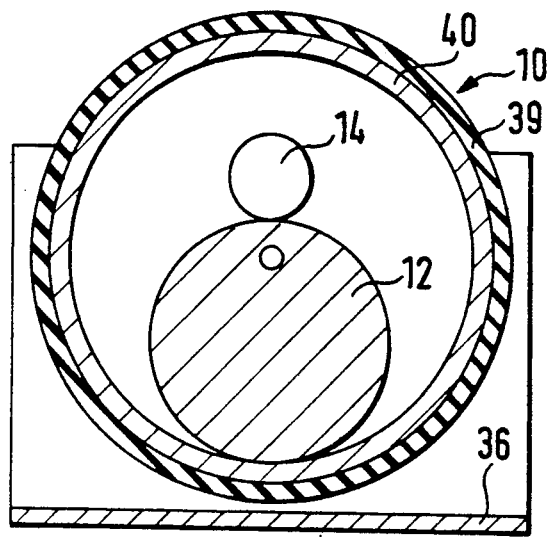
Figure 4:
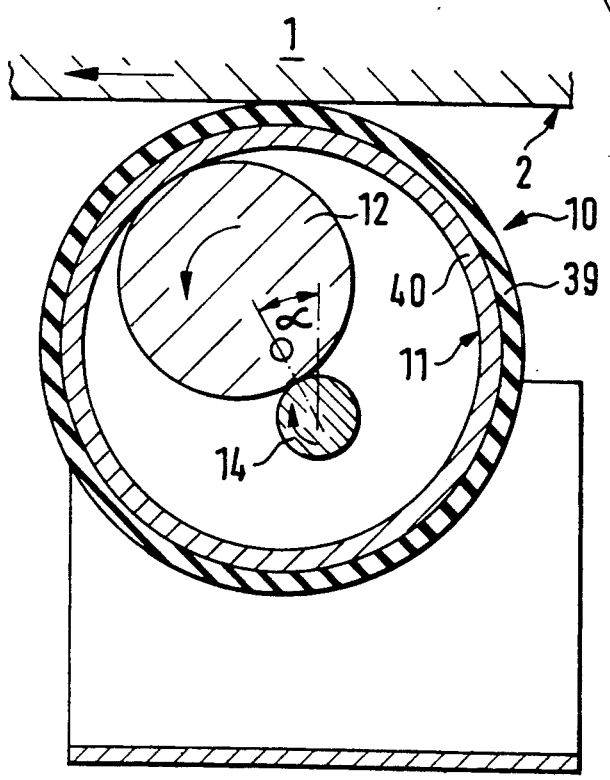

As FIGS. 2 and 3 show, the embodiment shown here of the roller drive unit according to the invention includes a drive roll 10 with a carrier body 40 and an outer jacket 39 made of frictional material, e.g., rubber. The carrier body 40 of the drive roll 10 is mounted at one end on a pivot support 16 via a roller bearing 17. The pivot support 16 in turn is mounted on a drive shaft 13 which runs parallel to the axis of symmetry of the drive roll 10 but offset to its side by the pivot support 16. One end of the drive shaft 13 passes through a side wall of a frame 36 and is mounted there by a bearing (roller bearings) (not shown). On the end protruding above the frame 36, the drive shaft 13 is provided with a gear 24 which is connected via a drive train (not shown) with an electric motor (not shown) to transmit torque.

The pivot support 16 is designed as a cylindrical body, within, on the one hand, a drive gear 14 sits which is wedged onto the drive shaft 13. On the other hand, an intermediate gear 12 is mounted in the pivot support 16 such that it engages with the drive gear 14.

On both sides of the intermediate gear 12, braking devices 22a and 22b are provided which are pretensioned via a pair of spring rings 23 with respect to the intermediate gear 12. Such braking devices are known from the initially cited state of the art.

The carrier body 40 of the drive roll 10 (viewed in the axial direction) is provided at the level of the intermediate gear 12 with an internal gear ring 11 which engages with the intermediate gear 12.

If the drive motor (not shown) is not exerting any torque, i.e., is standing still, the drive roll 10 is suspended by the force of gravity in the position shown in FIG. 3 such that the intermediate gear 12 lies below the drive gear 14. If the electric motor (not shown) is set into rotation such that the drive gear 14 rotates in the clockwise direction shown in FIG. 4, then initially, because of the braking effect of the braking arrangement 22/23, a force in the clockwise direction is exerted on the pivot support 16 such that the drive roll 10 is pivoted in the clockwise direction. To limit the pivoting path, a stop (not shown in the the figure) is provided between the pivot support 16 and the frame 36. As soon as this stop is reached and the pivot support 16 can pivot no farther, the braking arrangement 22/23 begins to slip so that the drive roll 10 rotates counterclockwise. If a container 1 to be conveyed arrives, the outer jacket 39 comes into a frictional connection with its bottom surface 2. The driving torque of the drive gear 14 and the electric motor (not shown) is transmitted via the intermediate gear 12 to the internal ring gear 11 and thus to the drive roll 10 so that a force directed to the left in FIG. 4 is exerted on the container 1 to convey it. The greater the driving torque is, the greater the vertically upward directed force between the drive roll 10 and the bottom surface 2 of the container 1 becomes so that the frictional connection and thus the traction increase. The frictional connection-producing force also increases with decreasing angle alpha. This angle alpha, which is indicated in FIG. 4, lies between a line passing through the pivot axis of the drive roll 10 (the pivot axis corresponds to the axis of rotation of the drive gear 14) and standing vertically on the bottom surface 2 of the container 1 and a line passing through the pivot axis of the drive roll 10 and its axis of rotation (indicated in FIGS. 3 and 4 by a circled dot).

Instead of the single intermediate gear 12 according to the embodiments according to FIGS. 2 through 4, it is possible to use a pair of intermediate gears 12, 12' as shown in FIG. 5. Here also again it is important that the contact line between the roll and the container lie in the direction of transportation behind the pivot axis. In this embodiment, although the load on the gears or the teeth is reduced, the arrangement is nevertheless somewhat more costly.

Another embodiment of the invention is explained below with reference to FIG. 6 which shows a schematic horizontal section.

In this arrangement, a rotor 34 of an electric motor in the frame 36 is mounted via roller bearings at both ends of its motor shaft 37. A stator 35 is attached to the frame 36.

At one end, the motor shaft 37 is designed as a gear which forms a sun gear 31 of a planetary gear system. The sun gear 31 engages with a planetary gear 29 which is rotatably attached to an axle journal seated in a planetary carrier 28. A ring gear 30 is arrange in housing-firm connection concentrically around the sun gear 31 and engages with the planetary gear 29.

The planetary carrier 28 is provided with a shaft which is mounted in the frame 36 via two roller bearings. The distal end of the shaft is designed as a transmission output gear 27.

The transmission output gear 27 is engaged with an intermediate gear 26 mounted in the frame 36 which in turn engages with another intermediate gear 25 mounted in the frame 36. The gear arrangement is covered by a lid 38a which simultaneously forms one of the bearings for the intermediate gears 25 and 26.

The intermediate gear 25 engages with the gear 24 mentioned above in FIG. 2 which is attached rotationally rigidly on the drive shaft 13. The drive shaft 13 is mounted at both ends in the frame 36 via drive shaft bearings 15a, 15b. In its central region, the drive gear 14 is formed on the drive shaft 13.

On the shaft 13, the pivot support 16 is mounted via a pair of roller bearings 18a, 18b such that it can be pivoted about the drive shaft 13. The pivot support 16 at one end has cylindrical outer contour, the axis of symmetry of the outer contour lying asymmetrically with respect to the axis through the drive shaft 13. Roller bearings 17a, 17b are seated on this terminal cylindrical end segment via which the carrier body 40 with outer jacket 39 of the drive roll 10 is mounted.

The internal gear 11 is formed on the carrier body 40 in the region of the drive gear 14 on the drive shaft 13.

A bearing pinion 19 (screwed in) is provided in the pivot support 16 running parallel to the drive shaft 13.

On the bearing pinion 19, the intermediate gear 12a, 12b, here designed as two parts, is rotatably mounted by means of an intermediate gear bearing (roller bearing) 12c. The intermediate gear 12a, 12b engages both with the drive gear 14 and with the internal gear 11.

On each of the two sides of the drive gear 14, a braking arrangement 22a and 22b is provided which brakes the intermediate gear 12a, 12b with respect to the pivot support 16. For tightening and thereby for adjusting the braking devices 22a, 22b, a pair of spring rings 23 is provided which are held by an end-position head of the bearing pinion 19. The braking force is increased or reduced depending on how far the bearing pinion 19 is screwed into the pivot support 16a, 16b.

Around the drive shaft bearing 15b on the right in FIG. 6, a concentric recess open to the inside is provided in a right lid 38b which is screwed onto the right side (in FIG. 6) of the frame 36. In this recess, a screw rotation spring 33 is inserted such that it is attached with one end to the lid 38b and with its other end to the pivot support 16. In this case, the spring is arranged such that it is unstressed in the rest position of the drive roll 10 (see FIG. 3), and in the working position (see FIG. 4), it is pretensioned to act on the pivot support 16 in the direction of its rest position.

At the place where the end of the spring 33 is connected to the pivot bearing 18, it forms a stop pinion 41 extending into the annular hollow space of the lid 38b which, depending on the direction of rotation, can engage with one of two (not shown) stop faces in the hollow space of the lid 38b so that the pivoting movement of the pivot support 16, viewed from the rest position, is limited to symmetrical pivoting angles.

The mode of operation of the arrangement can be derived from the above description. The means of attachment (not described here) such as retainer rings and the like are known to the expert.

Another embodiment of the invention is explained below with reference to FIG. 7, in which the parts having the same function there have the same reference numbers. In the following description, we shall refer separately only to those parts which differ substantially from the parts previously described.

A first substantial difference between this embodiment of the invention and described previously in that the ring gear 30 of the planetary gear system is rotatably mounted in the frame 36 via a ring gear bearing (roller bearing) 32. On the ring gear 30, one end of a helical rotary spring 33 engages, which is arranged concentrically in a hollow space around the motor shaft 37. The other end of the spring 33 is attached to the frame 36. The ring gear 30 also has a stop pinion 41 which can strike against a stop face (not shown) in the recess space for the spring 33. As a result, the path of rotation of the ring gear 30 is limited. Naturally, this can also be accomplished by suitable design of the spring 33 itself.

What this arrangement achieves, on the one hand, is that a rotational impulse arising on the drive roll 10 due to striking a container already on motion is not direct but only "damped,' i.e., reaches the rotor 34 and its motor shaft 37 with a rising flank of reduced steepness. As a result, a considerable reduction in the load on the tooth flanks of all gears is obtained. Furthermore, the spring 33 acts as a restoring spring (like the embodiment shown in FIG. 6) when the supply of current to the electric motor is cut off. In this case, the energy stored in the spring 33 acts via the braking device 22/23 in the sense of a load on the pivot support 16 in the direction of its rest position. This effect can be further intensified by briefly bridging or short-circuiting the connecting clamps of the electric motor after its is switched off so that the rotor 34 can be regarded as stationary. In another embodiment of the invention (not shown in the figures), the restoring spring arrangement shown in FIG. 6 is additionally provided.

Another preferred embodiment of the invention, the construction of which is similar to that according to FIG. 6, is described below with reference to FIGS. 8 and 9. Parts with the same or similar functions have the same reference numbers and are not explained in detail again.

In this preferred embodiment according to FIGS. 8 and 9, special stopping devices are provided which limit the pivoting movement Of the pivot support into the two upper working positions.

These stopping devices include a recess 42 in the end of the pivot support 16 which has a contour similar to that of a keyhole. In FIG. 9, the contour of the recess 42 is indicated by broken lines.

A frame stop plate is installed on the opposing inside surface of the frame 36. This frame stop plate has a stop projection 48, the contour of which is shown in FIG. 9 by a dash-double-dotted line.

Engaging in recess 42 and lying below the stop projection 48 is drag key 45 which is essentially freely rotatably mounted on the drive shaft 13. The drag key 45 has a radially (to the shaft 13) projecting key head 46. The width of the key head 46 is such that its first side face 51 and its second side face 52, depending on the direction of rotation of the drag key 45, can engage with a first stop face 43 or a second stop face 44 on the pivot support 16 and with a third stop face 49 and a fourth stop face 50 on the stop projection 48.

If, as shown in FIG. 9, the pivot support 16 is pivoted in the clockwise direction to raise the drive roll 10, the second stop face 44 on the pivot support 16 (in the recess 42) engages with the second side face 52 of the key head 45 and turns the drag key 45 also in the clockwise direction until the first side face 51 of the key head 46 engages the fourth stop face 50 of the stop projection 48. When the pivot support 16 is pivoted in the other direction (counterclockwise), the first stop face 43 of the pivot support 16 engages with the first side 51 of the key head 46 and turns the drag key 45 until the second side face 52 of the key head 46 engages with the third stop face 49 of the stop projection 48.

Compared to a simple stopping pin on the pivot support 16 that can engage with the corresponding stop faces on the frame 36, this stopping device has the advantage that substantially higher forces can be absorbed. This stems from the fact that, despite the necessary relatively large pivoting angle, very massive constructed stop faces can be provided. This solid construction of the stop increases the service life of the roller drive unit, since the entire driving power that is transmitted during the transportation of a container from the drive roll to the container, when the container leaves the drive roll, must first be captured in the form of a pulse-like impact. The high driving powers, the pivot support 16 applies tremendous torques to the stop.

LIST OF REFERENCE NUMBERS

1 Container
2 Bottom surface
8 Roller shaft
9 Roller drive gear

10 Drive Roll
11 Internal gear
12 Intermediate gear
12c Intermediate gear bearing
13 Drive shaft
14 Drive gear
15 Drive shaft bearing
16 Pivot support
17 Roller bearing
18 Pivot bearing
19 Bearing pinion
20 Screw
21 Ring
22 Brake
23 Spring ring
24 Gear
25, 26 Intermediate gear
27 Transmission output gear
28 Planetary carrier
29 Planetary gear
30 Ring gear
31 Sun gear
32 Ring gear bearing
33 Helical spring
34 Electric motor rotor
35 Electric motor stator
36 Frame
37 Motor shaft
38 Lid
39 Outer jacket
40 Carrier body
41 Stop pins
42 Recess
43 First stop face
44 Second stop face
45 Drag key
46 Key head
47 Frame stop plate
48 Stop projection
49 Third stop face
50 Fourth stop face
51 First side face
52 Second side face

SUMMARY

ROLLER DRIVE UNIT

Roller Drive Unit

A roller drive unit is known which has a drive roll (10) and a pivot support (16) attached to a frame (36) for the rotational support of the drive roll (10) such that drive roll (10) can be pivoted from a bottom rest position, depending on the direction of rotation, into one of the two upper working positions. A drive motor for the controllable drive of the drive roll is connected via a gear train to the drive roll (10). The gear train includes a drive shaft about the axis of rotation of which the pivot support (16) holds the drive roll (10) in a pivoting manner. This arrangement is complicated and is very wide in design. It is proposed that the drive roll (10) be equipped with an internal gear (11) which is rotationally rigidly connected via an intermediate gear (12) with a drive gear (14) seated on the drive shaft.

What is claimed is:

1. A roller drive unit, comprising:
   a frame;
   a drive shaft rotatably mounted in the frame;
   a gear mounted on the drive shaft for engaging a drive motor;
   a pivot support mounted on the drive shaft and pivotable from a lower rest position to an upper working position;
   a drive roll rotatably mounted on the pivot support;
   an internal gear attached to the drive roll;
   a drive gear mounted on the drive shaft;
   an intermediate gear rotatably mounted in the pivot support and engaged between the drive gear and the internal gear; and,
   a spring connected for biasing the pivot support to the lower rest position.

2. The roller drive unit according to claim 1, wherein the pivot support is disposed within the drive roll.

3. The roller drive unit according to claim 1, wherein the internal gear is disposed substantially concentrically within the drive roll.

4. The roller drive unit according to claim 2, wherein the drive roll is mounted on a bearing at each end of the pivot support.

5. The roller drive unit according to claim 1, further comprising a breaking device mounted for frictionally engaging the intermediate gear.

6. The roller drive unit according to claim 1, further comprising a drive motor having a rotationally driven motor shaft, a sun gear mounted on the motor shaft, a ring gear concentric with the sun gear, a planetary gear carrier having at least one planetary gear engaged between the ring gear and the sun gear, wherein one of the ring gear, the sun gear, or the planetary gear carrier is biased against rotation by a spring element.

7. The roller drive unit according to claim 6, wherein the ring gear is mounted in the frame and is connected to one end of a helical rotating spring, the other end of the spring being attached to the frame.

8. The roller drive unit according to claim 1, further comprising a pair of braking devices connected to the pivot support on opposite sides of the intermediate gear and frictionally engaging first and second end faces of the intermediate gear.

9. The roller drive unit according to claim 1, further comprising a stopping device mounted between the pivot support and the frame to limit movement of the pivot support in the direction of the upper working position.

* * * * *